United States Patent [19]

Molitor

[11] 4,274,637
[45] Jun. 23, 1981

[54] GOLF BALL HAVING CELLULAR COVER

[75] Inventor: Robert P. Molitor, South Hadley, Mass.

[73] Assignee: Questor Corporation

[21] Appl. No.: 155,658

[22] Filed: Jun. 2, 1980

Related U.S. Application Data

[63] Continuation-in-part of Ser. No. 7,964, Jan. 31, 1979, abandoned.

[51] Int. Cl.³ ............................................. A63B 37/12
[52] U.S. Cl. ........................... 273/235 R; 273/DIG. 8; 521/139; 521/143; 521/144; 521/149; 521/150; 521/155
[58] Field of Search ..................... 273/235 R, DIG. 8; 521/149, 143, 155

[56] References Cited

U.S. PATENT DOCUMENTS

| 3,238,156 | 3/1966 | Kohrn | 521/54 |
|---|---|---|---|
| 3,264,272 | 8/1966 | Rees | 521/149 |
| 3,373,123 | 3/1968 | Brice | 521/54 |
| 3,437,718 | 4/1969 | Rees | 525/195 |
| 3,819,768 | 6/1974 | Molitor | 273/235 R |
| 3,940,146 | 2/1976 | Little | 273/235 R |
| 3,989,568 | 11/1976 | Isaac | 273/235 R |
| 4,102,829 | 7/1978 | Watanabe et al. | 521/81 |
| 4,123,061 | 10/1978 | Dusbiber et al. | 273/235 R |
| 4,141,559 | 2/1979 | Melvin et al. | 273/235 R |
| 4,169,599 | 10/1979 | Fujio et al. | 273/235 R |

FOREIGN PATENT DOCUMENTS

1321270  6/1973  United Kingdom ............... 273/235 R

*Primary Examiner*—Morton Foelak
*Attorney, Agent, or Firm*—Donald R. Bahr

[57] ABSTRACT

The subject invention relates to a golf ball having a cover which is completely or partially formed from a cellular polymeric material. By incorporating the subject invention into a golf ball structure, it is possible to selectively alter its "feel" characteristics, the physical properties and flight characteristics. The subject invention can be utilized with golf balls having either solid or wound cores. The subject golf ball cover can be formed from a plurality of natural and synthetic polymeric materials. It is preferred that the golf ball cover be formed from ionic copolymers of polyolefins and unsaturated monocarboxylic acids wherein said ionomers incorporate zinc or sodium ions. Mixtures of said ionic copolymers may likewise be utilized.

24 Claims, 11 Drawing Figures

GOLF BALL HAVING CELLULAR COVER

RELATED APPLICATION

This application is a Continuation-in-Part of application Ser. No. 7,964 filed Jan. 31, 1979, now abandoned.

BACKGROUND OF THE INVENTION

Golf balls have traditionally incorporated covers which are formed from polymeric materials. In this regard, the traditional golf ball having a cover formed from Balata rubber should be noted. The physical properties, and in particular, the "feel" of this Balata cover when struck with a golf club became the standard of the industry. In recent years golf balls have incorporated covers which are formed from synthetic polymeric materials such as polyolefins and in particular, polyethylene, polyurethanes and ionic copolymers of olefins. The latter mentioned ionic copolymers of olefins were commercially introduced in the mid 1960's by E. I. Du Pont De Nemours & Co., Inc., Wilmington, Del. and sold under the trademark "Surlyn." Cover compositions which are based on Surlyn resins have become extremely popular and are highly advantageous in that the resulting covers are extremely cut and abrasion resistant. Golf balls incorporating Surlyn resin covers are commonly known in golfing circles to be more cut resistant than Balata covered balls. These Surlyn covered golf balls have achieved widespread consumer acceptance. About sixty percent of the golf balls sold in the United States during 1976 incorporated Surlyn covers. Golf balls incorporating Surlyn covers are generally described in U.S. Pat. No. 3,454,280 issued July 8, 1969.

Most Surlyn resins as sold by E. I. De Pont De Nemours & Co., Inc., contain zinc or sodium ions. A plurality of Surlyn resins of varying physical properties are sold by E. I. De Pont De Nemours & Co., Inc. The physical properties of these various resins are described in technical bulletins which are readily available from E. I. De Pont De Nemours & Co., Inc. The principal Surlyn resins which are useful in this invention as golf ball cover materials are Surlyn 1605 and Surlyn 1557.

Mixtures of various Surlyn resins as cover stock materials are likewise highly advantageous. Suitable mixtures for use as cover stock materials are described in detail in U.S. Pat. No. 3,819,768 issued June 25, 1974.

Whether used singly or in mixtures, Surlyn resins, while being extremely advantageous due to their cut and abrasion resistance have one notable disadvantage as a golf ball cover stock material, namely that the feel of the ball when struck by a golf club is significantly different than that of a traditional Balata covered golf ball.

When a golf ball is struck by a golf club, an audible sound is emitted. This sound is generally referred to as the click of a golf ball. Again, the click of Surlyn covered golf balls is significantly different than the click of Balata covered golf balls. Some golfers and in particular, the purist who has traditionally used a Balata covered golf ball, find the change in click and the different feel of Surlyn covered golf balls to be objectionable.

For purposes of control some advanced golfers can strike a golf ball in such a manner that the flight of the ball incorporates substantial back spin. It is desirable that a golfer be able to impart back spin to a golf ball for purposes of controlling its flight and controlling the action of the ball upon termination of flight. For example, if back spin is incorporated into the flight of a ball, the ball can be made to stop dead once it strikes the green instead of bounding forward. The ability to incorporate back spin onto a golf ball is related to the extent to which a golf ball deforms when it is struck with a golf club. Because traditional Balata covers are more deformable it is easier to impart spin to these traditional balls. In contrast, Surlyn covered golf balls due to the nature of the cover are not as deformable as Balata covered balls and hence it has been more difficult to impart a sufficient degree of back spin to these balls. This control advantage will be discussed in greater detail herein below.

A standard which is generally referred to as the coefficient of restitution is one of the criteria useful in judging the rebound characteristics of a golf ball. The nature of the cover stock has substantial bearing on the coefficient of restitution of any given golf ball. By use of the subject invention one skilled in the art can alter the coefficient of restitution of a given golf ball to a much greater degree than was possible utilizing the covers of the prior art. The ramifications of the coefficient of restitution in relation to the subject invention will be described in greater detail herein below.

Competitive advertising campaigns comparing Balata and Surlyn resin covered golf balls have extensively exploited the above enumerated disadvantages of Surlyn resin covered golf balls. In particular, these advertising campaigns have exploited the different feel, and the difficulty of imparting spin to Surlyn resin covered golf balls. One advertising campaign even went so far as to compare a Surlyn resin covered golf ball to a rock. By incorporation of the subject invention into the golf ball structure it is possible for the first time to achieve and selectively alter the cut resistance, the abrasion resistance, the coefficient of restitution, the feel, the click and the ability to impart back spin to a golf ball. Generally speaking, by use of this invention, these physical characteristics of a golf ball can be varied to an optimum degree by varying the apparent density and distribution of the cells in a golf ball cover. As a result of these variations, one skilled in the art can produce a golf ball having the desirable qualities of both Balata and Surlyn resin covered golf balls.

DESCRIPTION OF THE PREFERRED EMBODIMENTS

In its broad concept the subject invention relates to the use of cellular material as cover stock for conventional golf ball centers. As will be described in greater detail herein below, the cellular cover stock of this invention can have a uniform cellular cross section, a varying cellular cross section or be incorporated with one or more non-cellular skins. The cellular cover stock of the subject invention can be formed from any foamable, natural or synthetic polymeric material.

Such materials are known in the art and are generally prepared with blowing agents, nucleating agents, and other additives as necessary to create the desired structures.

Because they are cheaper and have superior processing characteristics, thermoplastic materials are generally preferred. However, thermosetting resins can likewise be used in accordance with this invention. Typical, but not limitative of the properties desirable for the resin are good flowability, moderate stiffness, high abrasion resistance, high tear strength, and good mold release among others. Preferred polymeric materials for use in accordance with this invention are ionomer resins comprising a copolymer of ethylene and an unsaturated monocarboxylic acid which is available under the trademark Surlyn from E. I. Du Pont De Nemours & Company of Wilmington, Del.

In accordance with the preferred embodiment of this invention, the cellular cover in question is formed from either a zinc or sodium ionic copolymer of ethylene or mixtures thereof. The sodium copolymer being sold by the E. I. De Pont De Nemours & Co., Inc., under the trademark Surlyn 1605, the zinc copolymer being sold under the trademark Surlyn 1557.

The use of singular ionic copolymers of polytheylene materials as golf ball cover stock is described in U.S. Pat. No. 3,454,280 issued July 8, 1969. The use of mixed Surlyn resins in accordance with this preferred embodiment is described in great detail in U.S. Pat. No. 3,819,768 issued June 25, 1974. Ionic copolymers of the type suitable for use in this invention are further described in great detail in U.S. Pat. No. 3,264,272 issued Aug. 2, 1966.

Figure 1:
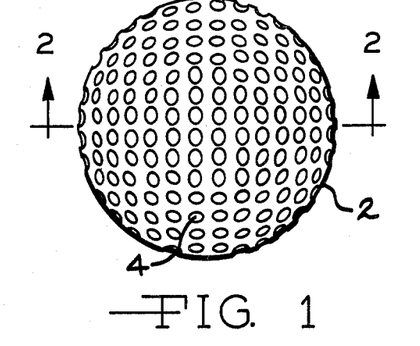
FIG. 1 is a front view of a conventional golf ball.

Referring to the drawings, it can be seen that FIG. 1 illustrates a standard golf ball structure 2 which incorporates a plurality of conventional dimples 4. Dimples 4 are molded into the cover material which is the subject matter of this invention. In this patent application when referred to generally golf ball 2 is meant to include golf balls having solid or wound centers.

Figure 2:
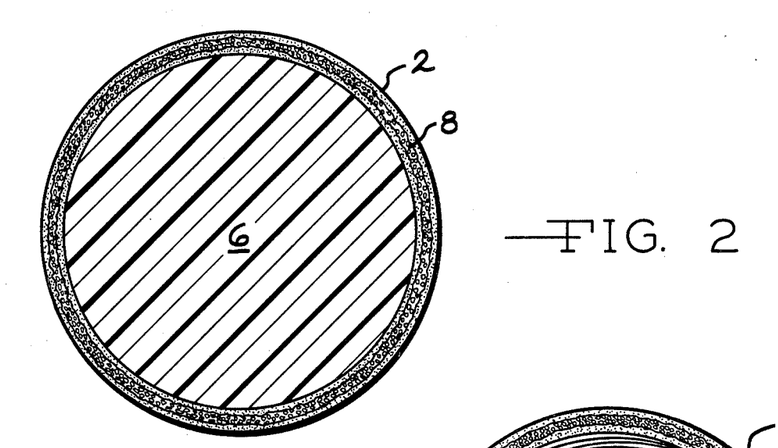
FIG. 2 is a sectional view through line 2—2, of FIG. 1 showing the cover of this invention on a solid core golf ball.

Referring to FIG. 2 of the drawings, it can be seen that golf ball 2 incorporates a solid center 6 which is in turn encapsulated by a cellular cover 8. Center 6 generally comprises a highly cross linked polybutadiene sphere. The technology for producing solid centers such as center 6 is generally known in the prior art and does not constitute part of the subject invention.

Figure 3:
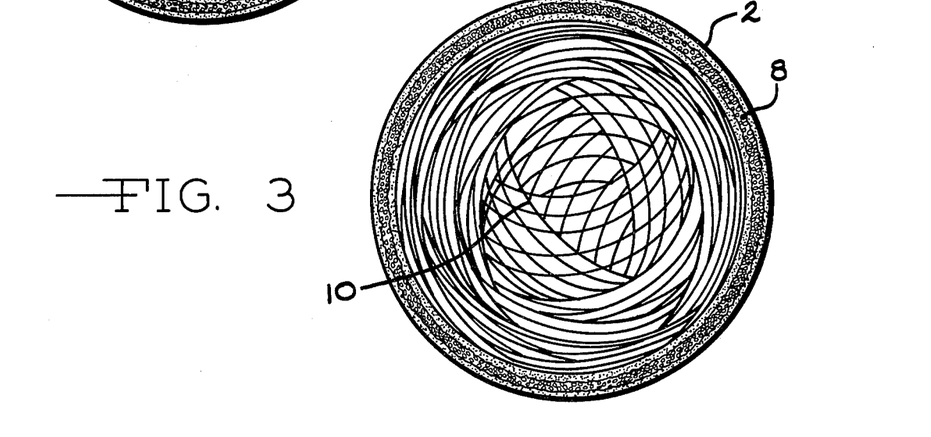
FIG. 3 shows the cover of this invention on a wound core golf ball.

Referring to FIG. 3 it can be seen that in this instance golf ball 2 incorporates a wound center 10 which is in turn encapsulated by a cellular cover 8. Wound center 10 generally comprises the central sphere not shown over which is wound an extended length of an elastomeric thread in order to produce a sphere of a given size. Technology for the production of spheres of the type illustrated by wound center 10 is well known in the prior art and does not constitute part of this invention.

Figure 4:
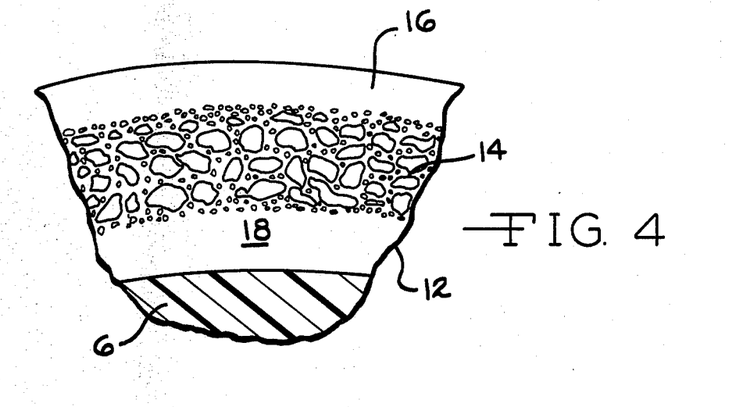
FIG. 4 is a sectional view showing one embodiment of the cover of this invention wherein said cover incorporates non-cellular skins.
Figure 5:
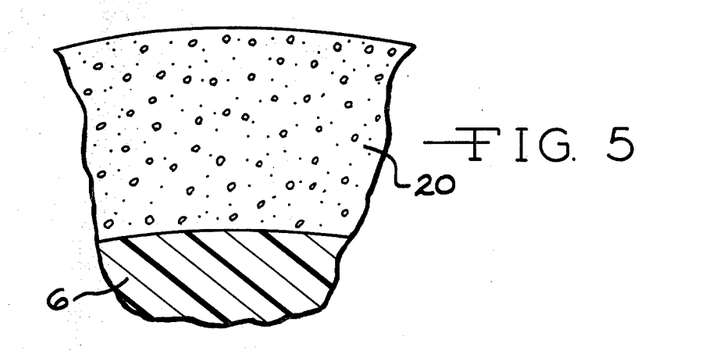
FIG. 5 shows another embodiment of this invention wherein the composite cover is essentially cellular.
Figure 6:
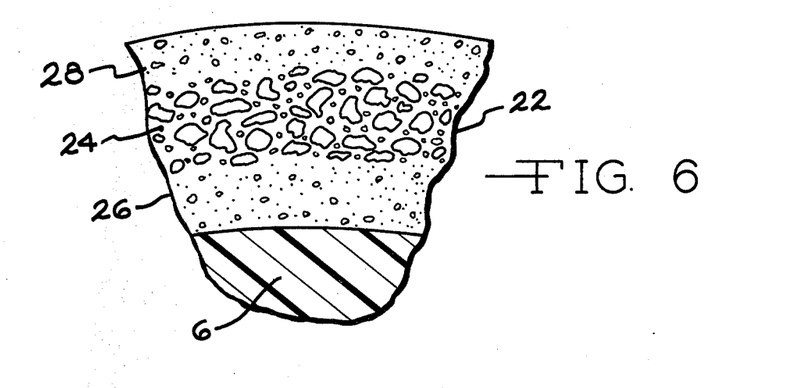
FIG. 6 illustrates still another embodiment of this invention wherein the cover incorporates areas of varying cellular density.

FIGS. 4, 5 and 6 represent three distinct embodiments of the subject invention. While these three distinct embodiments are illustrated on a solid center which has been given a common designation 6, it is understood that the embodiments as illustrated in FIGS. 4, 5 and 6 can likewise be incorporated on wound centers such as center 10 of FIG. 3.

FIG. 4 represents a preferred embodiment of this invention for use in conjunction with a solid center. In this embodiment cover 12 incorporates a central cellular stratum 14 which is sandwiched between two non-cellular skins 16 and 18. Non-cellular skins 16 and 18 are formed in situ by varying the process parameters wherein cover 12 is molded onto center 6.

Skins 16 and 18 can be altered and formed by a plurality of techniques, for example, skins 16 and 18 can be formed by varying the temperature of the mold during the initial stages of the injection molding process and by varying other parameters, such as melt temperatures, injection time, injection speed, injection pressure, nozzle type, gating, venting, holding pressure, holding time, shot weight, blowing agent concentration, nucleator concentration, polymeric composition, mold surface treatment and mold lubricant.

FIG. 5 illustrates another embodiment of this invention wherein cover 20 incorporates an essentially uniform cellular structure. In this embodiment cover 20 is again molded over center 6.

FIG. 6 represents still another embodiment of this invention wherein cover 22 is molded over center 6. Cover 22 incorporates a central stratum 24 which is sandwiched between a pair of strata 26 and 28. The central stratum 24 has an apparent density which is less than that of strata 26 and 28. To put it in other words, strata 26 and 28 have a greater apparent density than that of central stratum 24. Naturally, it is obvious to one skilled in the art that in the region of the interfaces between stratum 24, 26 and 28, the apparent density of cover 22 will vary. The respective apparent densities of strata 24, 26 and 28 can be varied by one skilled in the art by altering the process parameters as discussed above wherein cover 22 is molded onto center 6.

For purposes of this application, when densities and specific gravities are referred to, they are referred to in "apparent densities" and "apparent specific gravities." These terms take into consideration the fact that the cover stocks of this invention are non-uniform in that they may incorporate skins and variable cell structures. These terms take into consideration these variables and give the actual density and specific gravity of the average structure.

The solid centers for use in accordance with this invention are approximately 1.50" diameter. In accordance with contemporary thinking, all golf balls are 1.680"–1.690" in diameter. Therefore, it can be seen that the cover thickness of the ball of this invention is approximately one-half the difference between the center size and the finished ball size, or approximately 0.090". I have found that cover thicknesses of this size are generally advantageous and functional when used with this invention. Naturally, it would be possible to utilize larger diameter centers and hence minimize the cover thickness. Generally, it could be said that the cover thickness should not decrease to a point beyond which functional foaming is impossible. While full parameters of the cover thickness have not been explored, it generally appears as though functional foaming cannot be achieved, when the cover is injection molded onto the center, if the cover thickness decreases below 0.060".

It is within the realm of this invention to utilize covers thicker than the above mentioned standard of approximately 0.090". Thicker covers in accordance with this embodiment can be from about 0.090" to about 0.125". Naturally, when thicker covers are utilized, the center diameter is reduced accordingly.

It is understood by those skilled in the art that the diameter of wound centers is normally greater than that of a solid center. During the process whereby the cover is placed over the center, the wound center is compressed with the net result that the effective size in the finished center is similar to the 1.50" dimension discussed above relative to a solid center.

In addition to the above described preferred Surlyn resins, natural polymeric materials may be used in accordance with this invention.

Balata or gutta percha is an example of natural polymeric material adapted for use in accordance with this invention.

The range of synthetic polymeric materials which can be used in accordance with this invention, other than the above described Surlyn resins, is much broader than the range of natural materials. Suitable polymer materials which may be adapted for use in this invention are as follows:

Homopolymeric and copolymeric substances, such as (1) vinyl resins formed by the polymerization of vinyl chloride or by the copolymerization of vinyl chloride with unsaturated polymerizable compounds, e.g., vinyl esters; (2) polyolefins such as polyethylene, polypropylene, polybutylene, transpolyisoprene, and the like, including copolymers of polyolefins; (3) polyurethanes such as are prepared from polyols and organic polyisocyanates; (4) polyamides such as polyhexamethylene; (5) polystyrene, high impact polystyrene, styrene acrylonitrile copolymer and ABS, which is acrylonitrile, butadiene styrene copolymer; (6) acrylic resins as exemplified by the copolymers of methylmethacrylate, acrylonitrile, and styrene, etc.; (7) thermoplastic rubbers such as the urethanes, copolymers of ethylene and propylene, and transpolyisoprene, block copolymers of styrene and cispolybutadiene, etc.; and (8) polyphenylene oxide resins, or a blend with high impact polystyrene known by the trade name "Noryl." This list is not meant to be limiting or exhaustive, but merely illustrates the wide range of polymeric materials which may be employed in the present invention. Mixtures of the above described material may also be used.

It is within the purview of this invention to add to the cover compositions of this invention compatible materials which do not affect the basic novel characteristics of the composition of this invention. Among such materials are coloring agents, including dyes and pigments, fillers and similar additives. Additives such as antioxidants, antistatic agents, and stabilizers may also be added. The upper limit of the quantity of additives is usually about 5 percent by weight of the product.

The golf ball cover material of this invention can be applied to a center in any standard manner. For example, the cover material can be injection molded directly around a pre-positioned center. Likewise two half shells of a cover can be formed from the cover material of this invention, these half shells are then positioned around a center and fused together in such a manner as to form a finished golf ball. Again the forming technique whereby the finished golf ball is produced is not an integral part of this invention. However, the cover composition of the subject invention can utilize many standard manufacturing techniques to form finished golf balls. Naturally the technique utilized must provide physical conditions sufficient to make foaming possible.

As was briefly discussed above the cover material of this invention is applied over a standard center in a conventional fashion. Centers of either the solid or wound type can be used in accordance with this invention. With reference to the wound type center a threadlike material is wound either over a solid core or a spherical shell which is liquid filled. The threadlike material which is wound around this small core is either in a thread or tape form. With reference to the solid center balls, these are balls wherein the center generally comprises a sphere which is formed from a resilient polymeric material. Because the center material is not an integral part of this invention it is not thought that a detailed discussion of center materials is necessary. However, it can be said that the cover material of the subject invention can be utilized in conjunction with any standard golf ball center.

As was mentioned above, the golf ball cover of the subject invention can be used as a means of altering or regulating the coefficient of restitution. The coefficient of restitution of a golf ball is generally indicative of the resiliency of the ball in question, hence indicative of the distance the ball will travel when struck with a golf club. Both the center and the cover contribute to the coefficient of restitution; however, for purposes of this invention we are concerned solely with the coefficient of restitution as it is affected by the cover material. The coefficient of restitution is generally measured by propelling a finished golf ball against a hard surface at a fixed velocity. After the ball has rebounded from the surface its velocity is again measured. The ratio of the rebound velocity over the initial velocity is the coefficient of restitution. The coefficient of restitution is directly related to the resiliency of a golf ball and how far it will travel when struck by a golf club, all other variables being constant.

The resiliency of a golf ball is regulated by the United States Golf Association via a test which is generally referred to as the Initial Velocity test. In this test, a golf ball is struck by a rotating club face. The rotating club face is turning at a speed of approximately 146 ft. per second. Once struck by this club face, the velocity of the ball is measured as it passes through two light screens which are positioned forward of said club face. The maximum prescribed limit for a golf ball which is tested in this manner is 225 ft. per second at 75° F. This upper limit standard of 255 f.p.s. corresponds to a coefficient of restitution of approximately 0.795.

With reference to the above described standards for coefficient of restitution, the subject cover material is particularly advantageous in that in using this invention golf balls with solid centers can be produced which closely approach the 0.795 maximum limit. In accordance with one embodiment of this invention this end is achieved by forming a center which exceeds the 0.795 limit and thereafter placing a cover on said center to decrease the coefficient of restitution to 0.795.

The ability and the degree which the coefficient of restitution can be altered is illustrated in examples below. From the data of these examples it can be seen that the coefficient of restitution of a given golf ball is altered by changing the cover stock material from a solid material to a cellular material. While it is certainly desirable to approach without exceeding the above mentioned maximum coefficient of restitution, what is desirable other than approaching this prescribed maximum limit is a matter of conjecture. The data in question amply demonstrate that by utilization of the subject invention, changes in the coefficient of restitution of a given golf ball are possible. By utilization of the subject invention design latitude in a given golf ball system is possible where in the prior art no such design latitude existed.

The cellular covers of the subject invention are formed by the in situ blowing of the polymeric material during the process whereby the cover is molded on to the core. A wide range of blowing agents may be utilized to effect the foaming of the polymeric material. Examples of suitable organic blowing agents are as follows: azobisformamide; azobisisobutyronitrile; diazoaminobenzene; N, N-dimethyl-N, N-dinitroso terephthalamide; N, N-dinitrosopentamethylene-tetramine; benzenesulfonyl-hydrazide; benzene-1, 3-disulfonyl hydrazide; diphenylsulfon-3-3, disulfonyl hydrazide; 4, 4'-oxybis benzene sulfonyl hydrazide; p-toluene sulfonyl semicarbazide; barium azodicarboxylate; butylamine nitrile; nitroureas; trihydrazino triazine; phenylmethyl-uranthan p-sulfonhydrazide; and inorganic blowing agents such as ammonium bicarbonate and sodium bicarbonate.

These blowing agents generally function by their thermal decomposition which creates an in situ gas that is aborbed by the melt. When pressure is released the melt expands to form the foam. In addition to this procedure, it is commercial practice to inject a gas into the melt under pressure such as nitrogen, air, trichloromonofluoromethane, pentane, carbon dioxide, etc. The gas is then absorbed and, again upon release of pressure, the melt expands into a foam.

The preferred embodiment of this invention utilizes a nitrogen generating blowing agent which is susceptible to thermal decomposition.

Naturally, the percentage of blowing agent utilized in accordance with this invention will vary with the physical and chemical properties of the blowing agent so utilized and the desired apparent density of the resulting golf ball cover. In accordance with the preferred embodiment of this invention, from 0.1 to 0.5 percent of Ficel EPA is utilized based on the weight of the thermoplastic resin. Fical EPA is a trademark used in conjunction with a blowing agent which is essentially azodicarbonamide. Ficel EPA is available from Sobin Chemicals, Inc., Sobin Park, Boston, Mass. 02201.

The apparent density of the cellular golf ball cover in accordance with this invention can also be varied by the injection techniques. The injection techniques in question are well understood by one skilled in the art and include such variables as the ram forward time, injection speed, shot size, gate size, mold venting, injection pressure, holding pressure, etc.

It is also well known, that, depending upon the nature of the blowing agent utilized, one can produce a unicellular foam structure or an interconnecting cell structure for the golf ball covers of this invention. In accordance with the preferred aspect of this invention the golf ball cover incorporates a unicellular foam structure.

As mentioned above, the golf ball cover of the subject invention can be applied to a suitable center by a plurality of means. In accordance with the preferred aspects of this invention the golf ball cover is applied to the core by injection molding. In the preferred injection molding technique a master batch of formulated plastic molding powder is prepared. This master batch is dry blended and includes one or more polymer materials, coloring agents, antioxidants, blowing agents, etc. Naturally, the blowing agent is blended into the polymeric material at a temperature below the decomposition temperature of said blowing agent. This master batch may then be pelletized. A golf ball center is then positioned in a mold. The above mentioned master batch pellets are then fed into the injection molding machine and the resulting melt is injected into the mold in such a manner that the polymer material foams and flows around and adheres to the core. During this molding process the dimples are formed on the cover. The resulting golf ball is then allowed to cool whereupon an essentially finished golf ball is removed.

Another significant aspect of the subject invention is that by the use of a cellular cover stock material the net cost of the golf ball cover is decreased. High quality polymeric materials which are suitable for use as golf ball cover stock material are relatively expensive. For example, the cost of the above described Surlyn resins including in-house processing, before injection molding onto a golf ball center, is at least eighty cents ($.80) per pound. By means of this invention the utilization of the golf ball cover stock material is maximized; that is, more golf ball covers are produced per pound of material. To put the cost aspects of the subject invention in their proper perspective, one can say that it is cheaper to make a golf ball cover out of a cellular polymeric material wherein the cells contain a blowing gas than to make said cover out of the non-cellular polymeric material. Considering the cost of the polymeric materials involved it is evident that this cost saving feature is a significant advantage.

The resulting composite golf ball cover of the subject invention is likewise advantageous in that the apparent specific gravity of the cover stock is less than the specific gravity of the balls which are covered with non-cellular materials. The apparent specific gravity of the composite cover stock including the non-cellular skins as described above can be from about 0.65 to about 1.50 in accordance with the broad embodiment of this invention. A preferred range for this apparent specific gravity is from about 0.65 to about 1.25 with the most preferred apparent specific gravity being from about 0.75 to about 0.80. In order to make an objective comparison, these specific gravities must be compared to the specific gravities of the non-cellular materials. These specific gravity variations can be achieved by varying the cellular structure of the subject golf ball cover. As a point of reference, it should be noted that the Surlyn resins as used on the prior art golf balls have a specific gravity of 0.940 to 0.965.

The physical properties and flight characteristics of a golf ball are affected to some degree by the weight distribution in the resulting finished golf ball. In some instances it is desirable to concentrate the weight as near as possible to the center of gravity of the ball. Considering this fact, advantages in ball design are automatically produced by the subject invention in that a greater percentage of the overall weight is concentrated in the center of the ball as compared to a conventional ball with a noncellular cover. In can further be seen that for the first time one skilled in the art of golf ball manufacture can alter dynamics and flight characteristic of a resulting golf ball by varying the density of the cover stock material. Because of this weight distribution it is possible to impart greater spin to a golf ball when struck by a club as there is less rotational inertia to overcome. Before this invention this mode of design latitude was not possible.

In addition to the advantage as discussed above which results from weight distribution, this invention is very advantageous because the resulting golf ball has different high speed and low speed impact properties, when compared to a similar ball with a non-cellular cover.

At high speed impact the cover deforms to such a degree that the club face comes into substantially more contact area with the cover as compared to a ball having a non-cellular cover. As a result, greater control can be imparted to the ball to allow purposeful manipulation of the ball in play, for example, back spin, drawing, fading. The energy required for high speed deformation of the cover is less than necessary with conventional covers. This allows more energy at impact to be imparted directly into the inner core material where it can enhance the flight of the golf ball.

In contrast, this same cellular covered ball has different low speed impact properties, which are useful in putting. At low speed impact the cellular covered ball requires a greater impact force than a conventional ball for the same distance of travel since the cellular cover at low speed impacts creates a deadening effect which is similar to Balata covered balls. It is well known that in putting, margins of error can be greatly reduced when more force is required to move a ball a certain distance on the putting green.

An example of these control properties at low speed impacts is as follows: If a ball, such as a ball with a conventional non-cellular Surlyn cover, bounces off the face of the putter, the margin of error can be very great. In contrast, if more energy is needed to impart movement of the ball, errors will be minimized in their effect on ball movement.

Another significant advantage of these low speed impact properties in putting is that as a result of the energy absorption as described above, the golf ball coming off the putter face established a true roll sooner than a ball with a non-cellular cover. Prior art balls with non-cellular covers tend to skid on the green before starting a true roll because the covers are not as capable of absorbing energy in a low speed impact sequence.

It is to be noted that in accordance with this invention, all of the above discussed critical physical properties can be varied by controlling the variation in the cell size, cell size distribution cover thickness and apparent density of the cellular cover material. Because of the above described interaction of the ball of this invention with the club face, superior control and feel can be realized. As a result of this control and feel a skilled player can create at will draws, fades, and on approach to the green, make the ball bite and hold in a superior manner due to the greater back spin.

Figure 7:
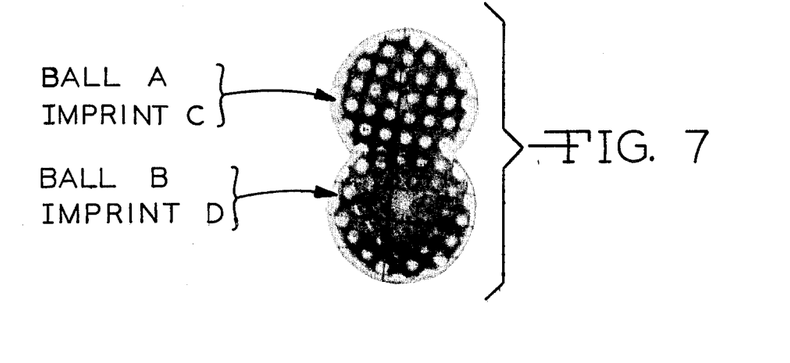
FIG. 7 illustrates the superior high speed impact properties of the golf ball of the subject invention.
Figure 8:
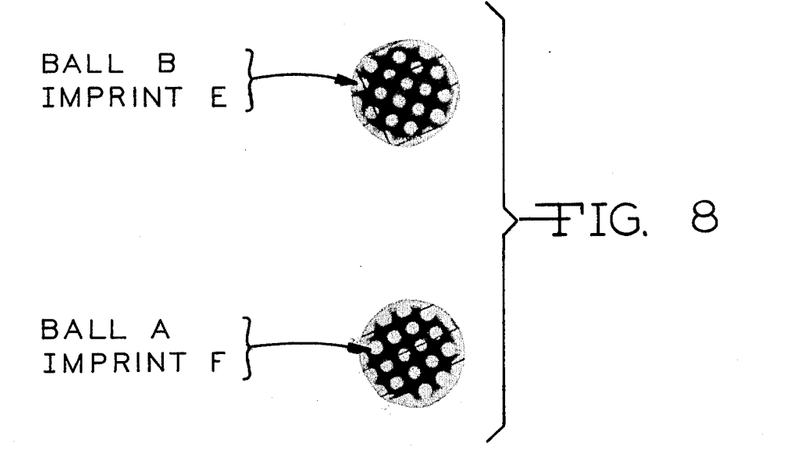
FIGS. 8 and 9 illustrate the superior low speed impact properties of the golf ball of this invention.
Figure 9:
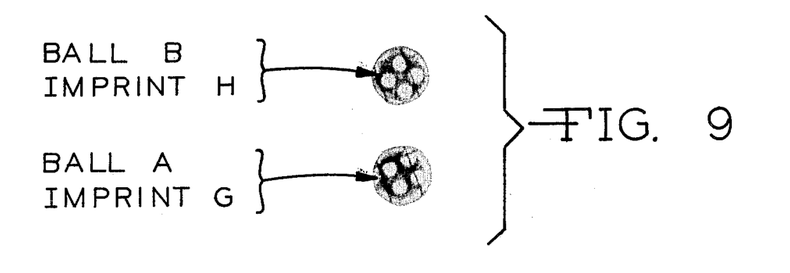
Figure 10:
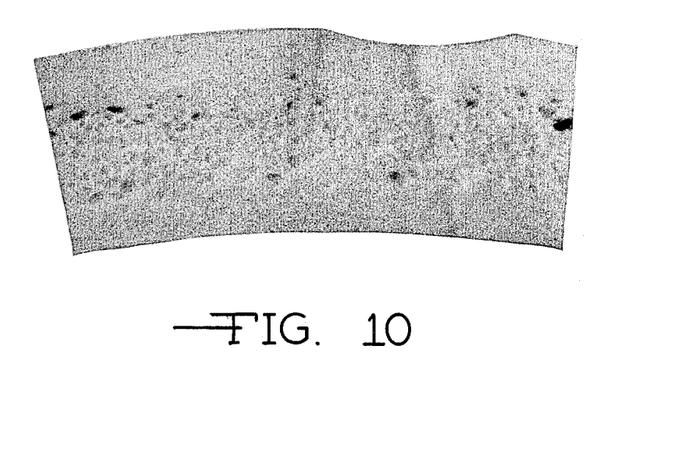
FIG. 10 is a photo micrograph showing a cross section of a representative golf ball cover in accordance with this invention wherein said cover has well defined inner and outer skins.
Figure 11:
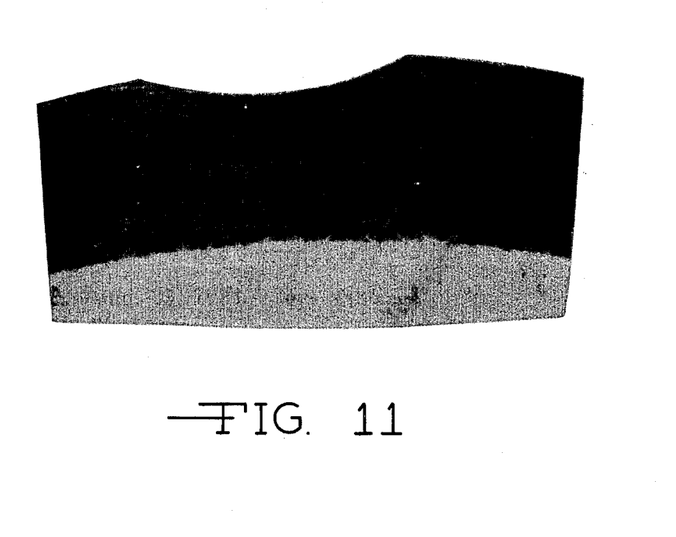
FIG. 11 is a photo micrograph showing a cross section of a representative golf ball cover in accordance with this invention wherein said cover has no inner skin and a minimal outer skin.

The ability to control the golf ball of this invention when struck by a golf club as a result of its desirable high speed and low speed impact properties is illustrated in FIGS. 7, 8 and 9. In the test as illustrated by FIGS. 7 and 8, the impacts were made by feeding specimen balls into a golf ball firing machine, wherein the ball is driven against a steel plate at 125 ft. per second. For making the imprints in question, the face of the steel plate is covered with a carbon type transfer paper. The high speed impact test used to make the imprints of FIGS. 7 and 8 were identical. In FIG. 7 an imprint was made by ball A. Ball A is a Surlyn covered golf ball having Center A as described herein below and the cover of a golf ball manufactured by the applicant and sold under the trademark TOP-FLITE. The cover of this ball is made in accordance with the teachings of U.S. Pat. No. 3,819,768 issued June 25, 1974. The imprint made by ball B of FIG. 7 was made by a ball which was nearly identical in all respects to the ball used to make imprint C except that the cover stock was cellular using 0.3 percent of Ficel EPA blowing agent. The resulting golf ball was similar to the ball described in Example 1 and illustrated in FIGS. 2 and 4. It can be readily seen that imprint D is larger than imprint C. The average diameter of imprint C was 1.020 inches while the average diameter of imprint D was 1.068 inches. In accordance with the theories discussed above the surface distortion of ball B with the steel plate was significantly greater than the surface distortion of ball A. In addition to the greater surface distortion of ball B over ball A it can be seen that ball B further wets out to a greater degree as the dimple pattern imprint of ball B is not as sharp as the dimple pattern imprint of ball A. Accordingly, greater control could be imparted to the ball.

In FIG. 8, balls "A" and "B" as described above in connection with FIG. 7 were fired in accordance with the test procedure of FIG. 7 at 80 feet per second. Ball "B" formed imprint "E" which had a diameter of 0.789". Ball "A" formed imprint "F" which had a diameter of 0.750". As can be seen from the difference in the diameters of these imprints, ball "B" deformed significantly more than ball "A" during this test procedure.

FIG. 9 is concerned with the low speed impact properties of a golf ball of this invention. In the test as illustrated in this figure, balls "A" and "B" as described above in connection with FIG. 7 were utilized. These balls were dropped from 100" onto a steel plate. Ball "A" formed imprint "G" which had a diameter of 0.416". Ball "B" formed imprint "H" which had a diameter of 0.422". Again from the differences in these diameters, it can be seen that ball "B" as per imprint "H" tended to wet out significantly more than ball "A" as per imprint "G". In addition to imprints "G" and "H" relative to this test, it should be noted that in this test ball "A" rebounded to a height of 76" and ball "B" rebounded to a height of 73". This difference in rebound further points out that the ball of this invention would have a softer feel on the face of the golf club. It is felt that this test would be analogous to a putting shot on a golf course.

Relative to the test of FIGS. 7, 8 and 9, it should be noted that in order to achieve maximum uniformity, these tests were conducted on balls having identical centers. In actuality, this is not possible or practical in the formation of commercially saleable balls because the cover of ball "B" is significantly lighter than the cover of ball "A". Due to this difference in weight in a practical situation the weight of the center of ball "B" should have been adjusted upwardly in order to compensate for this difference in cover weight. If this adjustment was in fact made, it is felt that the differences in the respective imprints of balls "A" and "B" in FIGS. 7, 8 and 9 would have been greater than those enumerated above because ball "B" would have had greater mass and, hence, greater kinetic energy upon impact.

Table I below represents data from driving tests as were carried out on the ball of this invention in comparison with standard commercially available balls. In the driving test, ball "C" was a standard commercially available two piece ball as sold by the applicant under the trademark "TOP-FLITE." Ball "B" was a ball made in accordance with this invention and generally in accordance with Example I herein below. Ball "C" had a coefficient of restitution of 795. Ball "B" had a coefficient of restitution of 782.

Relative to the data of Table I, it is particularly noteworthy that ball "B", the ball of this invention, had a carry advantage over ball "C" at 145 feet per second. At 160 feet per second ball "C" had a slight carry advantage over ball "B". The carry advantage of ball "B" at 145 feet per second is thought to be particularly significant considering the additional above enumerated advantageous properties of the ball of this invention as are reflected in ball "B".

Relative to the data of Table I, it should be noted that the club speed of 145 feet per second is high considering the ability of an ordinary golfer to strike a golf ball. It is felt that a club speed of 145 feet per second would represent the upper spectrum of golfers, such as a 4 or 5 handicap golfer. The test at 160 feet per second, while interesting from a comparative point of view, is not felt to be meaningful relative to the abilities of the average golfer as very few golfers are able to achieve a club speed of 160 feet per second.

It is particularly noteworthy that ball "B" went almost as far as ball "C" considering that the coefficient of ball "B" was significantly less than that of ball "C". It is felt that this fact demonstrates a particularly advantageous property of the ball of this invention in that apparently more energy from the golf club head is being transferred through to the core and less energy is being absorbed by the cover. This advantage would allow one to stay well under the prescribed coefficient of restitution of 0.795 as correlates with the initial velocity as specified by the USGA and yet manufacture balls which will travel further. In regard to the total distance to which a ball can travel, it should be noted that the USGA recently added a specification in this regard. The specification in this regard states that a machine driven ball will not travel more than 280 yards plus 8 percent when hit in accordance with specified conditions. It is not felt that this test is limiting relative to the balls of this invention as the specified yardage of 280 yards is beyond the capabilities which an average human can drive a golf ball. This test is mentioned in order that the above discussed data can be evaluated in its proper perspective.

Driving Procedure

Combined distance of a driver and a #5 iron test procedure was as follows: 6 of each of balls "B" and "C" were fired 3 times using a #1 wood (driver) at 145 feet per second club head speed. Each ball was fired 3 times using a #5 iron at 145 feet per second. The entire test procedure was repeated at 160 feet per second. The driving was effected using a True Temper Driving Machine, Ser. No. 7 as purchased from the True Temper Corporation, 1623 Euclid Avenue, Cleveland, Ohio. The tests were conducted at 68°-70° F. at a wind speed of 0-2 m.p.h. All distances are in yards.

TABLE I

| | | Ball "B" | Ball "C" |
|---|---|---|---|
| Driver - 145 fps | Carry | 197 | 194 |
| | Total Distance | 211 | 210 |
| #5 Iron - 145 fps | Carry | 168 | 162 |
| | Total Distance | 179 | 182 |
| Combined Distance Driver & #5 Iron 145 fps | Carry | 365 | 356 |
| | Total Distance | 390 | 392 |
| Driver - 160 fps | Carry | 215 | 214 |
| | Total Distance | 232 | 231 |
| #5 Iron - 160 fps | Carry | 176 | 179 |
| | Total Distance | 182 | 184 |
| Combined Distance Driver & #5 Iron 160 fps | Carry | 391 | 393 |
| | Total Distance | 414 | 415 |

The term "consisting of" as used in the definition of the ingredients present in the claimed golf ball and in the below listed examples is intended to exclude the presence of other materials in such amounts as to interfere substantially with the properties and characteristics possessed by the composition set forth but to permit the presence of other materials in such amounts as not substantially to affect said properties and characteristics adversely.

In this application the term "wets out" is utilized in describing the deformation of golf balls when they come in contact with golf clubs. The term is meant to define the degree to which the spherical golf ball surface deforms to mate up with the planar non-deformable golf club face.

The following examples will illustrate the subject invention. These examples are given for the purpose of illustration and not for purposes of limiting this invention.

EXAMPLES

In the below listed examples, unless specified otherwise, when the golf ball is referred to as having a solid center, the centers all had a diameter of approximately 1.50". Three different centers were utilized. Center A had a coefficient of restitution of 0.780±0.010 and a compression of 85±10 PGA. Center B had a coefficient of restitution of 0.765±0.010 and a compression of 60±10 PGA. Center C had a coefficient of restitution of 0.790±0.010 and a compression of 100±10 PGA.

The centers in question consist essentially of highly cross linked polybutadiene rubber wherein the principle cross linking agents are peroxides and heavy metal organic salts.

In the examples, when a wound Center D is utilized, said center has a diameter of 1.560±0.010", a compression of 90±10 PGA, and a coefficient of restitution of 0.825±0.015. Wherein said wound center is manufactured by winding in a conventional manner onto a highly resilient polybutadiene solid center having a diameter of 1.125" rubber thread having a high content of polyisoprene, to the above described compression and size dimensions.

In all the below listed examples except Examples 18 and 19, the covers were applied to the respective centers by injection molding techniques wherein the center is pre-positioned in a mold and the cover stock material injected into said mold in such a manner that it flows around the pre-positioned center. The center and the mold temperature were approximately 70° F.

Wherein the cycle time of said injection molding process is such that the material is given ample time to freeze around the pre-positioned center. Generally, these cycle times are on the order of 30 to 50 seconds depending on mold cooling rates. Naturally, it is understood by one skilled in the art, that the cycle time varies with the nature of the polymer material being used as cellular cover stock material and in particular its melt temperature.

Wherein compression is specified, for balls and ball components this compression was measured on a Riehle Model #501A-17 machine and measuring its deformation under a fixed load at a fixed stroke. This unit is used rather than the conventional PGA unit because of greater accuracy. Throughout these tests, the fixed load was 200 lbs. The data received from said test were then converted into PGA compressions by the use of the simple formula: 160 minus the Riehle reading equals the PGA reading. PGA compressions are specified as they are a standard widely used by industry. In this test one reading was taken on each of twelve amples and the average of said test specified as the compression.

Wherein barrel test durability data is specified, the 12 balls were fired from a pneumatic cannon for 100 blows at 135 f.p.s. at room temperature into a seven-sided steel container, 15 inches across first striking a metal plate with corrugations simulating the corrugations on an iron head, then rebounding off of the remaining sides.

Wherein the golf balls were checked for cold cracking durability, 12 balls were fired five times out of the pneumatic cannon of the coefficient of restitution machine as described below. The muzzle velocity of the balls in question was 165 feet per second. The balls were fired against a steel plate which was positioned at right angles to the axis of ball flight. The steel plate was positioned 10 feet from the muzzle of said cannon. Prior to firing, the balls were conditioned at 0 degrees Fahrenheit for 16 hours.

Where guillotine test data are specified, said tests were conducted by placing the ball into a retaining cup holding the lower third of the ball in a fixed position, a free falling weight of 1360 grams having a blunt edged blade similar to the leading edge of an iron club was allowed to fall from a height of 36 inches.

The coefficient of restitution data as specified below was arrived at by firing 12 balls from a pneumatic cannon at muzzle velocity of 125 f.p.s. against a steel plate which is positioned 10 feet from the muzzle of said cannon, and measuring both the initial velocity and return velocity of said rebounding ball. The ratio of said return velocity to said initial velocity is the specified coefficient of restitution. The results are reported as the average of the balls so tested.

Wherein low speed rebound data is specified, this data was arrived at by dropping 12 balls in question from a height of 100" onto a steel plate and measuring the rebound height of the dropped golf ball. The average test results are reported.

In the data all parts are given by weight unless otherwise specified. In preparation of the golf balls in question the specified polymeric cover material was dry blended with the specified blowing agent and fed into the extruder section of the injection molding process in a conventional manner.

In the specified data, wherein test results of a single ball is referred to, these data represent data for a plurality of balls as tested in accordance with the respective test procedures.

The test results of the balls in question are to be compared with a standard Surlyn covered golf ball having a solid center as sold by the applicant under the Trademark TOP-FLITE.

Wherein the ball in question has a PGA compression of 100, a coefficient of restitution of 0.90, a low speed rebound of 74 inches. Wherein 12 out of 12 balls passed the cold cracking and durability test, 12 out of 12 balls passed the guillotine test and 12 out of 12 balls passed the barrel test.

These test results are further to be compared with a standard Balata covered ball having a wound center as sold by the Acushnet Company, New Bedford, Mass. under the trademark Titleist Pro Trajectory. Wherein said balls have a compression of 96, a driving range of 223 yards, a coefficient of restitution of 0.780, and a low speed rebound of 68 inches. Wherein 12 out of 12 balls failed the barrel test. Twelve out of 12 balls passed the cold cracking durability test and 12 out of 12 balls failed the guillotine test.

In the example below, a plurality of components are referred to by the trademarks under which they are sold. The products in question in accordance with the best information available to the applicant are as follows: In the cover stock formulation listed in the examples the Titanium Dioxide, unless otherwise specified, was added via a Masterbatch "A" which had the following composition:

4 parts Surlyn 1557 to 1 part Unitane 0-110. Unless otherwise specified, the blowing agent was added via Masterbach "B" which is sold under the trademark Nortech MF 1039 H.

| Product Trademark | Chemical Description | Manufacturer |
|---|---|---|
| Surlyn 1557 | Zinc ionic polyethylene | E. I. Du Pont De Nemours & Co., Inc., Wilmington Delaware |
| Suryln 1605 | Sodium ionic polyethylene | E. I. Du Pont De Nemours & Co., Inc., Wilmington, Delaware |
| Unitane | Titanium dioxide | Am. Cyanamid Stamford, CT |
| Ficel EPA | Modified 1—1 Azobisformamide (Azodicarbonamide) | Haake Inc. Saddlebrook, NJ |
| Nortech MF 1039 H | 4 parts polyolefin 1 part 1—1 azobisformamide (Azodicarbonamide) | Northern Petrochemical Company Clinton, MA |

EXAMPLE 1

In this example, center A was utilized. A cover stock was formed by dry blending the components of Table 2 below.

TABLE 2

|  | Parts |
|---|---|
| Surlyn 1605 | 88.00 |
| Surlyn 1557 | 17.40 |
| TiO$_2$ Master Batch A | 35.20 |
| Blowing agent Master Batch B | 2.32 |

The compression of the resulting golf ball was 95. A barrel test resulted in 12 out of 12 balls passing. The cold cracking test resulted in 6 out of 6 balls passing.

The guillotine test resulted in 12 out of 12 balls passing. The coefficient of restitution of the ball was 0.780. In the low speed rebound test, the ball bounced 72 inches.

EXAMPLE 2

In this example, center B was utilized. A cover stock was formed in accordance with Table 3 below.

TABLE 3

|  | Parts |
| --- | --- |
| Surlyn 1605 | 88.00 |
| Surlyn 1557 | 17.40 |
| TiO$_2$ Master Batch A | 35.20 |
| Blowing agent Master Batch B | 2.32 |

The compression of the resulting golf ball was 90. A barrel test resulted in 12 out of 12 balls passing. The cold cracking test resulted in 6 out of 6 balls passing. The guillotine test resulted in 12 out of 12 balls passing. The coefficient of restitution of the ball was 0.780. In the low speed rebound test, the ball bounced 72 inches.

EXAMPLE 3

In this example, center C was utilized. A cover stock was formed in accordance with Table 4 below.

TABLE 4

|  | Parts |
| --- | --- |
| Surlyn 1605 | 88.00 |
| Surlyn 1557 | 17.40 |
| TiO$_2$ Master Batch A | 35.20 |
| Blowing agent Master Batch B | 2.32 |

The compression of the resulting golf ball was 110. A barrel test resulted in 12 out of 12 balls passing. The cold cracking test resulted in 6 out of 6 balls passing. The guillotine test resulted in 12 out of 12 balls passing. The coefficient of restitution of the ball was 0.785. In the low speed rebound test, the ball bounced 70 inches.

EXAMPLE 4

In this example, center D was utilized. A cover stock was formed in accordance with Table 5 below.

TABLE 5

|  | Parts |
| --- | --- |
| Surlyn 1605 | 88.00 |
| Surlyn 1557 | 17.40 |
| TiO$_2$ Master Batch A | 35.20 |
| Blowing agent Master Batch B | 2.32 |

The compression of the resulting golf ball was 95. A barrel test resulted in 12 out of 12 balls passing. The cold cracking test resulted in 6 out of 6 balls passing. The guillotine test resulted in 12 out of 12 balls passing. The coefficient of restitution of the ball was 0.770. In the low speed rebound test the ball bounced 73 inches.

EXAMPLE 5

Example 4 was repeated except that a center having the following physical properties was utilized. The center had a diameter of 1.550 inches, a coefficient of restitution of 0.808, a weight of 37.0 grams and a PGA compression of 75. A cover stock was formed in accordance with Example 4. Because the center was smaller on diameter, the cover was naturally thicker.

The compression of the resulting golf ball was 93. A barrel test resulted in 12 balls no failures. The cold cracking test resulted in 12 balls no failures. The guillotine test resulted in 12 balls, slight dent in the cover. The coefficient of restitution of the ball was 0.781. In the low speed rebound test, the ball bounced 73 inches.

EXAMPLE 6

Example 4 was repeated except that a center having the following physical properties was utilized. The center had a diameter of 1.540 inches, a coefficient of restitution of 0.800, a weight of 36.7 grams and a PGA compression of 83. A cover stock was formed in accordance with Example 4. Because the center was smaller in diameter, the cover was naturally thicker.

The compression of the resulting golf ball was 97. A barrel test resulted in 12 balls no failures. The cold cracking test resulted in 12 balls no failures. The guillotine test resulted in 12 balls, slight dent in the cover. The coefficient of restitution of the ball was 0.775. In the low speed rebound test, the ball bounced 73 inches.

EXAMPLE 7

Example 4 was repeated except that a center having the following physical properties was utilized. The center had a diameter of 1.530 inches, a coefficient of restitution of 0.802, a weight of 36.1 grams and a PGA compression of 84. A cover stock was formed in accordance with Example 4. Because the center was smaller in diameter, the cover was naturally thicker.

The compression of the resulting golf ball was 99. A barrel test resulted in 12 balls no failures. The cold cracking test resulted in 12 balls no failures. The guillotine test resulted in 12 balls, slight dent in the cover. The coefficient of restitution of the ball was 0.772. In the low speed rebound test, the ball bounced 71 inches.

EXAMPLE 8

In this example center C was utilized, a cover stock was formed by dry blending the components of Table 6.

TABLE 6

|  | Parts |
| --- | --- |
| Polypropylene Pro-Fax 6323* | 49.25 |
| Polypropylene Pro-Fax 8523* | 49.25 |
| Blowing agent Master Batch B | 1.5 |

*This material is manufactured by Hercules, Wilmington, Delaware.

The compression of the foam covered ball was 105. The resulting balls appeared to be normal golf balls. Two out of 2 golf balls passed the guillotine test, however, as a result of this test these balls showed greater marring than would be evident on a Surlyn covered golf ball sold by the Applicant under the trademark "TOP-FLITE". The coefficient of restitution of the ball was 0.734. In the low speed rebound test, the ball bounced 64 inches. In testing for the coefficient of restitution, the covers on 7 out of 12 balls cracked during testing. The 0.734 figure is an average of the balls which did not crack.

EXAMPLE 9

In this example center D was utilized. A cover stock was formed by dry blending the components of Table 6 above.

The compression of the foam covered ball was 95. Two out of 2 golf balls passed the guillotine test with marring similar to that described in Example 8 above. The coefficient of restitution of the ball was 0.739. In the low speed rebound test, the ball bounced 65 inches.

In testing for the coefficient of restitution, the covers on 6 out of 12 balls cracked during testing. The 0.739 figure is an average of the balls which did not crack.

EXAMPLE 10

In this example center C was utilized. A cover stock was formed by dry blending the components of Table 7.

TABLE 7

|  | Parts |
|---|---|
| High Density Polyethylene | 98.5 |
| Blowing agent Master Batch B | 1.5 |

The resulting golf balls appeared to be normal golf balls. The compression of the foam covered ball was 110. Two out of 2 golf balls passed the guillotine test with marring similar to that described in Example 8 above. The coefficient of restitution of the ball was 0.719. In the low speed rebound test the ball bounced 66 inches. In testing for the coefficient of restitution, the covers on 10 out of 12 balls cracked during testing. The 0.719 figure is an average of the balls which did not crack.

EXAMPLE 11

The procedure of Example 10 was utilized to make golf balls using center D. Again the resulting golf balls appeared to be normal golf balls. The compression of the foam covered ball was 100. The results of the guillotine test were identical to those described in Example 8. The coefficient of restitution of the ball was 0.726. In the low speed rebound test the ball bounced 63 inches. In testing for the coefficient of restitution, the covers on 9 out of 12 balls cracked during testing. The 0.726 figure is an average of the balls which did not crack.

EXAMPLE 12

In this example center C was utilized. A cover stock was formed by dry blending the components of Table 8.

TABLE 8

|  | Parts |
|---|---|
| Thermoplastic rubber of the polyolefin blend type* | 98.5 |
| Blowing agent Master Batch B | 1.5 |

*As sold by Uniroyal Inc., New York, New York under the trademark "TPR 1900."

The compression of the foam covered ball was 85. The resulting balls appeared to be normal golf balls. Two out of 2 golf balls passed the guillotine test with marring similar to that described in Example 8 above. The coefficient of restitution of the ball was 0.756. In the low speed rebound test the ball bounced 61 inches.

EXAMPLE 13

The procedure of Example 12 was utilized to make golf balls using center D. Again the resulting golf balls appeared to be normal golf balls. The compression of the resulting ball was 65. The results of the guillotine test were identical to those described in Example 8. The coefficient of restitution of the ball was 0.773. In the low speed rebound test the ball bounced 63 inches.

EXAMPLE 14

In this example center C was utilized. A cover stock was formed by dry blending the components of Table 9.

TABLE 9

|  | Parts |
|---|---|
| Thermoplastic Polyester Elastomer* | 99.7 |
| Ficel EPA | .3 |

*As sold by E. I. Du Pont De Nemours & Company, Inc., Wilmington, Delaware 19898 under the trademark "Hytrel 5526."

The compression of the foam covered ball was 100. The resulting balls appeared to be normal golf balls. The coefficient of restitution of the ball was 0.778. In the low speed rebound test the ball bounced 69 inches. The balls passed the guillotine test, with marring similar to that described in Example 8 above.

EXAMPLE 15

The procedure of Example 14 was repeated to make golf balls using center D. The resulting golf balls appeared to be normal in appearance. The balls had a compression of 85. The coefficient of restitution of the ball was 0.785. In the low speed rebound test the ball bounced 71 inches. The balls passed the guillotine test with marring similar to that described in Example 8 above.

EXAMPLE 16

In this example center C was utilized. A cover stock was formed by dry blending the components of Table 10.

TABLE 10

|  | Parts |
|---|---|
| Thermoplastic Polyurethane* | 99.7 |
| Ficel EPA | .3 |

*As sold by B. F. Goodrich Co., Akron, Ohio under the trademark "Estane 58133."

The resulting golf balls appeared to be normal in appearance. The balls passed the guillotine test. The compression of the foam covered ball was 95. The coefficient of restitution of the ball was 0.750. In the low speed rebound test the ball bounced 66 inches.

EXAMPLE 17

Balls were made using the cover and procedure of Example 16. Center D was reduced in size to 1.53 and a coating applied to the windings to protect the windings from the high temperatures encountered during the molding of "Estane 58133." The resulting balls were normal in appearance. The balls had a compression of 80. The coefficient of restitution of the ball was 0.750. In the low speed rebound test the ball bounced 63 inches. The ball passed the guillotine test.

EXAMPLE 18

In this example center C was utilized except that it was modified to have a compression of 85 and it was 1.59 inches in diameter. A cover stock was formed by casting a liquid thermoset polyurethane foam as sold by Hoover Universal, Ann Arbor, Mich., under the trademark "Reyn-o-SOL RU 6709," around the center as described above. The balls passed the guillotine test. They had a compression of 95 and a coefficient of restitution of 0.783. In the low speed rebound test the ball bounced 77 inches.

EXAMPLE 19

In this example center D was utilized and a cover cast around said center in accordance with the procedure of Example 18. The balls passed the guillotine test. They had a compression of 85 and a coefficient of restitution of 0.761. In the low speed rebound test the ball bounced 63 inches.

EXAMPLE 20

In this example center C was utilized, a cover stock was formed by dry blending the components of Table 11.

TABLE 11

|  | Parts |
|---|---|
| Polypropylene Pro-Fax 6323* | 24.625 |
| Polypropylene Pro-Fax 8523* | 73.875 |
| Blowing agent Master Batch B | 1.5 |

*This material is manufactured by Hercules, Wilmington, Delaware.

The compression of the foam covered ball was 95. The resulting balls appeared to be normal golf balls. Two out of 2 golf balls passed the guillotine test, however, as a result of this test these balls showed greater marring than would be evident on a Surlyn covered golf ball sold by the Applicant under the trademark "TOP-FLITE." The coefficient of restitution of the ball was 0.730. In the low speed rebound test, the ball bounced 58 inches. In testing for the coefficient of restitution, none of the balls cracked during testing in contrast to the results as discussed in Example 8 above.

EXAMPLE 21

In this example center C was utilized. A cover stock was formed by dry blending the components of Table 12.

TABLE 12

|  | Parts |
|---|---|
| High Density Polyethylene Having a Shore Hardness of 59-D | 98.5 |
| Blowing agent Master Batch B | 1.5 |

The resulting golf balls appeared to be normal golf balls. The compression of the foam covered ball was 98. Two out of 2 golf balls passed the guillotine test with marring similar to that described in Example 20 above. The coefficient of restitution of the ball was 0.715. In the low speed rebound test the ball bounced 65 inches. In testing for the coefficient of restitution, the covers on 2 out of 12 balls cracked during testing. The 0.715 Figure is an average of the balls which did not crack. This example along with Example 10 shows that this invention is applicable to polyethylene and that cracking can be prevented or minimized by selecting a polyethylene having the proper hardness.

What is claimed is:

1. A golf ball having a center and a cover wherein said cover is formed from a cellular natural or synthetic polymer.

2. The golf ball of claim 1 wherein said cover has a uniform cellular cross section.

3. The golf ball of claim 1 wherein said cover has a variable cellular cross section.

4. The golf ball of claim 1 wherein said cover incorporates at least one noncellular skin.

5. The golf ball of claim 4 wherein said cover incorporates an outer noncellular skin and an inner noncellular skin adjacent to said center.

6. The golf ball of claim 4 wherein said cover incorporates an outer noncellular skin.

7. The golf ball of claim 4 wherein said cover incorporates an inner noncellular skin.

8. The golf ball of claim 1 wherein said center is solid.

9. The golf ball of claim 1 wherein said center is wound.

10. The golf ball of claim 1 wherein said cover is formed from a polymeric material selected from the group consisting of polyurethane resins, polyolefin resins and ionic copolymers of olefins having from 2 to 5 carbon atoms and a metal salt of an unsaturated monocarboxylic acid.

11. The golf ball of claim 2 wherein said cover is formed from a polymeric material selected from the group consisting of polyurethane resins, polyolefin resins and ionic copolymers of olefins having from 2 to 5 carbon atoms and a metal salt of an unsaturated monocarboxylic acid.

12. The golf ball of claim 3 wherein said cover is formed from a polymeric material selected from the group consisting of polyurethane resins, polyolefin resins and ionic copolymers of olefins having from 2 to 5 carbon atoms and a metal salt of an unsaturated monocarboxylic acid.

13. The golf ball of claim 4 wherein said cover is formed from a polymeric material selected from the group consisting of polyurethane resins, polyolefin resins and ionic copolymers of olefins having from 2 to 5 carbon atoms and a metal salt of an unsaturated monocarboxylic acid.

14. The golf ball of claim 1 wherein said cover is formed from a member selected from the group consisting of ionic copolymers of olefins having from 2 to 5 carbon atoms and the sodium salt of an unsaturated monocarboxylic acid having from 2 to 8 carbon atoms, and ionic cpolymers of olefins having from 2 to 5 carbon atoms and a zinc salt of an unsaturated monocarboxylic having from 2 to 8 carbon atoms.

15. The golf ball of claim 2 wherein said cover is formed from a member selected from the group consisting of ionic copolymers of olefins having from 2 to 5 carbon atoms and the sodium salt of an unsaturated monocarboxylic acid having from 2 to 8 carbon atoms, and ionic copolymers of olefins having from 2 to 5 carbon atoms and a zinc salt of an unsaturated monocarboxylic acid having from 2 to 8 carbon atoms.

16. The golf ball of claim 3 wherein said cover is formed from a member selected from the group consisting of ionic copolymers of olefins having from 2 to 5 carbon atoms and the sodium salt of an unsaturated monocarboxylic acid having from 2 to 8 carbon atoms, and ionic copolymers of olefins having from 2 to 5 carbon atoms and a zinc salt of an unsaturated monocarboxylic acid having from 2 to 8 carbon atoms.

17. The golf ball of claim 4 wherein said cover is formed from a member selected from the group consisting of ionic copolymers of olefins having from 2 to 5 carbon atoms and the sodium salt of an unsaturated monocarboxylic acid having from 2 to 8 carbon atoms, and ionic copolymers of olefins having from 2 to 5 carbon atoms and a zinc salt of unsaturated monocarboxylic acid having from 2 to 8 carbon atoms.

18. The golf ball of claim 1 wherein said cover is formed from a mixture of ionic copolymers selected from the group consisting of ionic copolymers of olefins having from 2 to 5 carbon atoms and the sodium salt of an unsaturated monocarboxylic acid having from 2 to 8 carbon atoms, and ionic copolymers of olefins having from 2 to 5 carbon atoms and a zinc salt of an unsaturated monocarboxylic acid having from 2 to 8 carbon atoms.

19. The golfball of claim 2 wherein said cover is formed from a mixture of ionic copolymers selected from the group consisting of ionic copolymers of olefins having from 2 to 5 carbon atoms and the sodium salt of an unsaturated monocarboxylic acid having from 2 to 8 carbon atoms, and ionic copolymers of olefins having from 2 to 5 carbon atoms and a zinc salt of an unsaturated monocarboxylic acid having from 2 to 8 carbon atoms.

20. The golf ball of claim 3 wherein said cover is formed from a mixture of ionic copolymers selected from the group consisting of ionic copolymers of olefins having from 2 to 5 carbon atoms and the sodium salt of an unsaturated monocarboxylic acid having from 2 to 8 carbon atoms, and ionic copolymers of olefins having from 2 to 5 carbon atoms and a zinc salt of an unsaturated monocarboxylic acid having from 2 to 8 carbon atoms.

21. The golf ball of claim 4 wherein said cover is formed from a mixture of ionic copolymers selected from the group consisting of ionic copolymers of olefins having from 2 to 5 carbon atoms and the sodium salt of an unsaturated monocarboxylic acid having from 2 to 8 carbon atoms and ionic copolymers of olefins having from 2 to 5 carbon atoms and a zinc salt of an unsaturated monocarboxylic acid having from 2 to 8 carbon atoms.

22. The golf ball of claim 5 wherein said cover is formed from a mixture comprising from about 75 to about 25 percent of a copolymer of ethylene and a sodium salt of an unsaturated monocarboxylic acid having from 3 to 8 carbon atoms and from about 25 to about 75 percent of a copolymer of ethylene and a zinc salt of an unsaturated monocarboxylic acid having from 3 to 8 carbon atoms.

23. The golf ball of claim 5 wherein said cover is formed from a mixture comprising from about 70 to about 30 percent of a copolymer of ethylene and a sodium salt of methyl acrylic acid and from about 30 to about 70 percent of a copolymer of ethylene and a zinc salt of methyl acrylic acid.

24. The golf ball of claim 5 wherein said cover is formed from a mixture comprising about 70 percent of copolymer of ethylene and a sodium salt of methyl acrylic acid and about 30 percent of a copolymer of ethylene and a zinc salt of methyl acrylic acid.

* * * * *